United States Patent
Santhanam et al.

(10) Patent No.: US 6,339,048 B1
(45) Date of Patent: Jan. 15, 2002

(54) OIL AND OIL INVERT EMULSION DRILLING FLUIDS WITH IMPROVED ANTI-SETTLING PROPERTIES

(75) Inventors: Mahalingam Santhanam, Plainsboro; Keith McNally, Bedminster, both of NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 0 days.

(21) Appl. No.: 09/470,973

(22) Filed: Dec. 23, 1999

(51) Int. Cl.$^7$ .................................................. C09K 7/06
(52) U.S. Cl. ....................................... 507/131; 507/133
(58) Field of Search ................................... 507/131, 133

(56) References Cited

U.S. PATENT DOCUMENTS

| | | | |
|---|---|---|---|
| 3,259,572 A | * 7/1966 | Dickson | 507/131 |
| 3,575,883 A | * 4/1971 | Foley | 507/131 |
| 3,668,129 A | * 6/1972 | Willett | 507/133 |
| 4,663,366 A | * 5/1987 | Drake et al. | 507/131 |
| 4,941,983 A | * 7/1990 | Coates et al. | 507/131 |
| 5,620,946 A | * 4/1997 | Jahnke et al. | 507/131 |
| 5,710,110 A | * 1/1998 | Cooperman et al. | 507/131 |

* cited by examiner

*Primary Examiner*—Philip Tucker
(74) *Attorney, Agent, or Firm*—Michael J. Cronin

(57) ABSTRACT

This invention is of a drilling fluid composition containing a liquid thixotrope, which thixotrope is free of solvents or any other diluent, and is in easily usable, liquid form, pourable at ambient temperatures, and which provides effective and efficient rheological properties when used at low levels in such compositions. In a specific aspect, the invention provides an oil or oil invert emulsion drilling fluid composition containing one or more organoclays, and in addition contains a additive which comprises the reaction product of an alkoxylated nitrogen containing compound or a diamine, and one or more polycarboxylic acids in a specified equivalent ratio.

15 Claims, No Drawings

OIL AND OIL INVERT EMULSION DRILLING FLUIDS WITH IMPROVED ANTI-SETTLING PROPERTIES

BACKGROUND OF THE INVENTION

FIELD OF INVENTION

The invention hereof relates to improved drilling fluids also known in the oil service industry as drilling muds, and, in particular, to oil and invert oil based emulsion types of drilling fluids in which water is dispersed in an oil-based medium. Such drilling fluid compositions when prepared at a mud plant are often called mud plant formulations.

Mud plant formulations contain special materials to enhance drilling fluids properties such as rheology, therefore providing a drilling fluid that is homogeneous and stable and which prevents the weighting material used from settling out during transportation and storage. Once the drilling fluid is used and circulated through the bore-hole it becomes known as a field mud, indicating the mud contains bore-hole cuttings and other contaminants. Additives used to enhance specific properties of the mud plant formulation should not adversely affect mud performance while in the bore-hole. However, these materials in a preferred manner also provide on-going beneficial properties and enhanced mud performance during circulation through the bore hole.

The invention is particularly directed to providing novel fluids with enhanced rheological and anti-settling properties; anti-settling is the ability of the fluids to retain in suspension in their structure, and to convey along with the fluid a variety of types of solid particles, the most important of which are weighting materials and bore-hole cuttings. These properties are particularly valuable when non-vertical directional drilling is undertaken.

The present invention particularly relates to drilling fluid compositions or systems containing a described liquid additive that also reduces or eliminates settling of the weighting material during storage and transportation to the rig and during the drilling operation. The present invention more particularly involves a drilling fluid containing an improved additive which additive is in a pourable, liquid form at ambient temperatures and which does not need a solvent to achieve its liquid state. Such an additive, when incorporated under low shear mixing typically encountered in the mud plant into a drilling fluid, provides improved suspension of weighting agents and other additives both during storage, during transport to the rig and during use in the bore hole.

Surprisingly the additive, described below at length, works in a most preferred embodiment in a synergestic and harmonious manner with organoclays in the fluid, to provide a system which effectively works at both low shear and ambient temperature and at high shear and elevated temperatures.

BACKGROUND OF THE INVENTION

Drilling Fluid Compositions

United States oil industry rotary bit discovery drilling operations use "drilling muds" or drilling fluids. These muds are pumped under pressure down through a long string of drill pipe, then through the center of the drilling bit at the hole bottom, then back up through the annulus between the outside of the string of drill pipe and up the borehole wall to the surface. Oil-based drilling fluids, the liquid carriers of the mud, are often comprised of oils (diesel, poly alpha olefins or mineral, propylene glycol, methyl glycoside, and modified esters and ethers) and invert emulsions of oil in which water is dispersed in an oil-based medium.

Drilling muds provide a number of interrelated functions to satisfy the requirements of the oil industry for a commercial drilling fluid. These functions may be grouped as follows:

(1) The fluid must suspend and transport solid particles to the surface for screening out and disposal.

(2) It must transport a clay or other substance capable of adhering to and coating the uncased borehole surface, both (a) to exclude unwanted fluids which may be encountered, such as brines, thereby preventing them from mixing with and degrading the rheological profile of the drilling mud, as well as (b) to prevent the loss of downhole pressure from fluid loss should the borehole traverse an interval of porous formation material.

(3) It must keep suspended an additive weighting agent (to increase specific gravity of the mud), generally barytes (a barium sulfate ore, ground to a fine particular size), so that the entire column of drilling fluid is not interrupted upon encountering pressurized pockets of combustible gas, which otherwise would tend to reduce downhole pressure, as well as creating a "blowout" in which the fluid and even the drill stem are violently ejected from the well, with resulting catastrophic damages, particularly from fires.

(4) It must constantly lubricate the drill bit so as to promote drilling efficiency and retard bit wear.

The interrelatedness of these functions can be seen by the fact that the unwanted materials to be removed at the surface can include not only "cuttings" from the material through which the bit is passing, but also pieces of the drill bit itself, the barytes or other weighing materials, and substances particles such as gellants, dissolved gases, and salts created when other fluid constituents become "spent" under the high temperatures encountered in deeper wells, and sometimes fuse in agglomerative particles. Every substance added to achieve a desirable property, such as improved lubrication or pressure control, potentially results in the ultimate creation of a waste to be removed.

It should be noted that a drilling fluid must perform its various functions not only when the drill bit is actively encountering the bottom of the borehole, but also at times when the drill stem is inactive, or is being removed or re-inserted for some purpose. In particular, cuttings must be held in suspension in the event of shut-downs in drilling.

The Anti-settling Properties of Drilling Fluid Compositions

An ideal drilling fluid is a thixotropic system. That is, (1) it will exhibit low viscosity when sheared, such as during agitation or circulation (as by pumping or otherwise) but, (2) when the shearing action is halted, the fluid must set or gel to hold the cuttings in place, and it must become gelled relatively rapidly, reaching a sufficient gel strength before suspended materials fall any significant distance and (3) this behavior should be almost totally reversible. In addition, even when it is a free-flowing liquid, the fluid must retain a sufficiently high viscosity to carry all unwanted particulate matter from the bottom of the hole to the surface. Moreover, upon long-term interruption of circulation, such as when drilling fluid has been ejected from the borehole into a quiescent holding vessel or pond, the gel structure should be such as to allow the cuttings and other unwanted particulates over time to settle out from the liquid fraction.

A principal problem facing "mud chemistry" scientists and technicians is the production of drilling fluids, with the necessary thixotropic properties discussed above, which at the same time must possess critically important anti-settling properties. Drilling compositions have over the years involved the attention of both scientists and artisans, with scores of various improvements made and patented. The compositions of these various fluids may be considered a "black art" to many—in reality such fluids and their additives involve highly complex chemical, physical and rheological analysis using advanced scientific apparatus and intricate mathematical calculations and modeling.

"Anti-settling" involves considerations of assurance of suspension and control of widely-varying matter including weighting materials during transportation of the fluid to the drilling site. It ideally entails the necessity of a measure of control when shear rate and force is high, low, or non-existent, and requires control of syneresis and deposition of such particles over wide ranges of a) temperature (from 0° to as high as 300° C.), b) time durations, c) pressures (from only a few bars to those exerted by a column of fluid that can extend for thousands of feet) and d) drilling directions (from vertical to horizontal).

A search has been going on for many years for an improved additive for modifying and controlling the suspension properties of drilling fluids that would be efficient, easily handled, and readily dispersible in a broad range of drilling muds, and usable under a broad range of conditions.

Oil and Oil Invert Emulsion Drilling Fluids

Drilling fluids or muds are typically classified according to their base fluid or continuous phase, as water base muds and oil base muds. Drilling muds may contain a mixture of base fluids, and are typically classified by the predominating or continuous base fluid, with the fluid present in lesser quantities becoming the internal or emulsified phase.

The use of oil and invert oil-based drilling fluids or muds in oil exploration is increasing rapidly owing to the more demanding requirements encountered in drilling deep and/or non-vertical and deviated wells. Compared with the longer-established water-based drilling muds, they possess a number of advantages, including reduced interaction with earth formations, and improved lubricity. While the drilling fluids and methods of this invention are particularly useful in invert emulsion systems, they also find use in other oil-based muds.

Oil base muds may have an aromatic or aliphatic oil, or a mixture of oils, as the continuous phase. These oils may include diesel, mineral or synthetic (PAO, esters, ethers) oil. They may be comprised entirely of oil, or more commonly may contain water ranging from 5% to upwards of 50%. In this mud, water becomes the internal phase, is emulsified into the oil, as a heterogeneous fine dispersion and the resulting system is referred to as a oil-based or oil-invert emulsion mud. Oil-invert emulsion drilling fluids are generally used throughout the world and consist of a three-phase system: oil, water and fine particulate solids. The aqueous phase may be a brine. The addition of brine reduces the overall price of the fluid, reduces the risk of combustion of the oil, and improves the water acceptance of the mud. The brine of choice is commonly an aqueous solution of an inorganic salt such as sodium chloride or calcium chloride.

Emulsifiers, weight agents, fluid loss additives, salts and numerous other additives may be contained or dispersed into the mud at the mud plant or during use to improve its performance with respect to one or more properties. These additives may be organic or inorganic in nature.

How Drilling Muds Work

As was noted above, the drilling fluid used is pumped under pressure down through the string of drill pipe, through the center of the drilling bit, then through the annulus between the outside of the drill stem and the borehole wall, back up to the surface. This circulation constantly removes the cuttings from the instantaneous bottom of the hole, and lifts them the entire distance from this bottom to the surface for disposal. Such a distance can be in the thousands or tens of thousands of feet.

Drilling fluids are designed to be shear thinning and possess less dynamic anti-settling properties when being circulated down the drill pipe and out the bit, and to exhibit a recovery to a high enough viscosity at low shear rate to provide higher anti-settling properties while rising back up through the annulus. The presence of unremoved cuttings in the fluid will decrease drilling penetration rates, with resultant increase in the overall costs of drilling the well. Once in the annulus, the cuttings, which are generally denser than the continuous phase of the drilling mud itself, tend to settle downward under the influence of gravity. Note that this means the upward velocity of the drilling fluid in the annulus must be higher than the settling rate, so as to bring the cuttings to the top of the hole.

As the bit cuts into the earth, the cuttings accumulate as drilling continues and the depth of the hole increases. A drilling fluid used to carry these cuttings to the surface for removal must allow the bit to continue functioning, and the ever-deepening bottom hole (where the bit is cutting) to be kept clean and free of cuttings at all times. As the hole deepens, the total amount of fluid involved will increase, and the difference between surface conditions and those experienced down-hole will increase. Even when a hammer drill or other non-rotary drilling system is used, a drilling fluid or the equivalent is still needed to remove the bore hole cuttings and to perform the other above-described functions normally performed in rotary drilling systems by drilling fluids.

Hydrocarbon drilling for exploratory and production wells has increasingly been done from platforms located in water settings, often called offshore drilling. Both deep-sea and shallow fresh and salt water drilling employ either floating barges or rigs fixed in some fashion to the submerged surface of the earth. Drill cuttings removed from the bore-hole must either be discharged to the surrounding body of water or transported to a remote location; the liquid phase of spent drilling fluid must similarly be disposed of. The disposal of cuttings may be inhibited by the presence of deleterious substances adhering to cuttings particles, whether oil from the fluid or a material encountered in the borehole. Cuttings can be cleaned to some extent by the use of vibrating screens or other mechanical separation devices, by washing techniques, and by chemical treatments. However, because of possible pollution to the environment, particularly the marine environment, the off-shore disposal of drilling fluids as well as of cuttings is increasingly discouraged. Rather, both the fluids and the cuttings are separately collected and transported to on-shore sites for rejuvenation or disposal.

Directional Drilling

The requirements for drilling fluids with enhanced properties have become more complex over the past decade as a result of improvements in directional drilling technology, in which at least a portion of the well is drilled at an angle other than vertical. Such wells are also known as deviated wells.

Procedures for deviating wells have improved greatly over recent years with the introduction of more powerful and reliable downhole motors, and the introduction of more accurate techniques utilizing wireline techniques as well as the latest computerized downhole, sensing and micro-reduction equipment, including improvements in sounding apparatus and microwave transmission. These techniques are collectively referred to as Measurement While Drilling (MWD) techniques, because they permit the obtaining of data relating to down-hole conditions without the need to remove the drill string.

There are, however, a number of inherent problems in this approach to directional drilling, which affect the anti-settling requirements of a drilling mud; namely:

(1) The annulus carrying the mud with cuttings to the surface is no longer vertical and extended in distance versus vertical wells.

(2) Gravity on a horizontal hole pulls cuttings, weighting material and particulate matter, not controlled by the drilling fluid, to the bottom side of the bore (not the bottom of the hole as in traditional drilling) and results in drag on the bore wall.

(3) Horizontal "pay-out" zones, in view of their substantial length, are more susceptible to settling formation damages and a resultant loss of flow efficiency.

(4) The amount of drilling mud required is increased since the distances are greater, and the time required for the cuttings to reach the earth's surface also increases.

PRIOR ART

Two patents obtained by companies related to assignee describe drilling fluid additives which are not organoclays. U.S. Pat. No. 5,021,170 describes a viscosifying gellant for oil-based well bore fluids comprising a mixture of an organic clay and a sulfonated, ethylene/propylene/5-phenyl-2-norbornene terpolymer. U.S. Pat. No. 4,486,316 shows a drilling fluid comprising an aqueous dispersion of an emulsion polymerized latex comprised of an interpolymer of an olefinically unsaturated carboxylic acid monomer and at least one other, non-carboxylated polymerizable monomer, the latex being of a type which undergoes rapid increase in viscosity upon the addition of a sufficient amount of a basic material.

U.S. Pat. No. 5,254,531 describes oleophilic basic amine additives for invert drilling muds to regulate the flowability and pumpability of the drilling mud. The patent describes adding to the mud, containing an esterified oil, a basic amine compound having an oleophilic character and limited solubility in water and thereby forming in situ in the drilling mud an oil-soluble salt with said amine compound and a carboxylic acid formed by hydrolysis of the ester.

U.S. Pat. 4,781,730 describes an alkali metal or alkaline earth metal-containing composition (with or without a hydrocarbon-soluble dispersant) which are combined with the reaction product of a carboxylic acid and a polyhydroxyalkanolamine, with the preferred reaction product being an ester which forms between the hydroxyl moieties of the alkanolamine and the carboxylic acid (anhydride). The resultant compositions are discussed as useful for valve seat recession protection in internal combustion engines. The reaction product of the carboxylic acid and polyhydroxyalkanolamine acts as a demulsifier for the alkali metal or alkaline earth metal-containing composition. The patent describes a composition comprising a hydrocarbon-soluble or dispersible alkali metal or alkaline earth metal containing composition, and the reaction product of a polybasic acid and a polyhydroxyalkanolamine of the formula $RN[(AO)_xH][(DO)_yH]$. The polybasic acid may be either an acid or an anhydride, and is preferably a dicarboxylic acid.

As can be seen from the above brief review, the drilling fluid industry has constantly sought materials, alternatively referred to as thickeners, thixotropes, rheological additives or rheological control agents, which are used to control the rheological properties of drilling fluid compositions. Such rheological control agents must provide proper viscosity and rheological characteristics to the drilling fluid systems in which they are used. Depending on the composition of the system, the fluids made with these thickeners can be useful in a wide variety of oil-based drilling fluids.

Organophilic clays have long been known to be useful to thicken various drilling fluids and are used today in most drilling fluid compositions. Organoclays are very well known products and are the reaction product of smectite clay and quaternary amines. Exemplary U.S. Patents which describe various common kinds of such organically-modified clays are U.S. Pat. Nos. 4,208,218; 4,410,364; 4,412,018; and 4,517,112 which are incorporated by reference.

There are, however, drawbacks with the use of organically modified clays for thickening drilling fluid compositions. Most important of these drawbacks is that organoclays cause the fluid to increase in viscosity when subjected to the high shear and increased temperature encountered in a bore hole. This causes the mud to become very thick and much less useful.

Synthetic rheological thickeners have been used and include various amines and maleic acid and anhydride polymers in an attempt to avoid the use of organoclays. Two patents issued to Rheox Inc., assignee hereof show such products—U.S. Pat. No. 5,034,444 to Han Bo Yun and U.S. Pat. No. 5,710,110 to Murray Cooperman.

While not in the drilling fluid art, U.S. Pat. No. 5,034,444 discloses a coating composition containing a rheological additive which is the reaction product of an alkoxylated aliphatic nitrogen containing compound or an aliphatic diamine with a polycarboxylic acid. The molar ratio of the two ingredients covers a broad range—see col. 8, lines 10 to 15.

Two issued patents of one of the inventors hereof, i.e. U.S. Pat. Nos. 5,723,653 and 5,510,452 and U.S. pending patent application No. 09/023,064 filed Feb. 13, 1998 now U.S. Pat. No. 6,043,300 describe chemistry related to the chemistry described hereafter of the liquid additive used in the drilling fluid compositions of this invention.

Disadvantages of Current Systems

Organoclay thickeners for organic drilling systems are today prepared in solid form, and have been produced and used as thickeners in dry, solid form. Dispersion is critical to activation of the thickener and thickener efficiency is a direct function of dispersion into the system to be thickened. Problems associated with the use of solid thickeners, however, include poor dispersibility when added to organic systems under low shear conditions often encountered in the mud plant. When added to systems, solid thickeners by their nature tend to agglomerate to form clumps. Dispersion can be very slow, and can adversely affect the efficiency of specific manufacturing operations.

Particularly in formulations comprising other chemicals and ingredients, extended agitation and aging periods are required before proper incorporation and activation is attained. Even when such additives are furnished as solutions, they are still difficult to disperse uniformly, so as to avoid the production of local areas of high concentration. This difficulty requires users and formulators to develop crude empirical methods for estimating the final rheological properties of the drilling fluid formulations.

Manufacturers have long searched for a fast, effective and simple way of incorporating such thickeners into organic drilling systems. To satisfy this desire, some commercial solid thickeners and rheological additives are today sold for drilling compositions as liquids. Such thickening compositions are prepared by dissolving a solid rheological additive in an organic solvent, which solvent is Newtonian. The reason for the utilization of such an organic solvent is to lower the viscosity of the rheological additive, which is non-pourable and solid, to provide ease in handling as a liquid. The choice of type and percentage of solvent depends on the desired viscosity of the thickening composition mixture. Typically, the viscosity of the pourable thickening composition mixture should be less than about 250–300,000 cP (at 10 RPM with a Brookfield RVT viscometer) so that it will readily pour from the storage container as a liquid, and rapidly incorporate into the system to be thickened at room temperature. The solvent selected for each such commercial composition has, up to this time, almost exclusively been a volatile organic solvent. Ranges of ratios of 20% to 50% rheological additive to 50%–80% solvent are common for such commercial liquid products.

A liquid thickening composition having little or no VOC contributes little or zero VOC to the system being thickened, while having the advantage of being pourable.

The manufacture of drilling fluid compositions using a pourable thickener, which thickener is substantially 100% active, containing no or very little solvent, has been perceived heretofore as presenting daunting technical difficulties that led many scientists to conclude that it would be impossible to achieve. Rheological additives must provide high levels of viscosity or thickening, as well as anti settling properties to systems, which prior to such addition are often less viscous. Some systems, must in fact become very viscous as a result of the addition. The rheological additives must be efficient—when added at very small relative weight levels—and must, therefore, have the ability, at such levels, to impart significant increases in viscosity to much larger volumes of organic drilling systems. Rheological additives in fact often must impart to drilling fluid systems at very low shear rates a behavior that approaches that of a solid which remains in place in the drilling hole. These requirements led scientists to wrongly conclude that such additives must themselves have very high viscosity levels, and that they must be either solid or solid-like.

In summary, in the manufacturing of oil and oil based emulsion drilling fluids, despite the numerous types of rheological additives known in the art, research has been independently and simultaneously conducted toward both 100% active liquid thickeners that are in pourable, pumpable forms, and which are highly efficient and are readily dispersible in the composition to be thickened; and, in addition, toward non-VOC-containing rheological additives which overcome the deficiencies associated with prior art volatile solvent-mixed thickeners.

OBJECT AND SUMMARY OF THE INVENTION

Objects of the Invention

It is a specific object of the present invention to provide an invert emulsion drilling fluid which contains organoclays and one or more additives as described herein which has very rapid viscosity increase under low shear conditions. When incorporated into a fresh or new drilling fluid the viscosity build is effective at suspending solids such as weighting materials during transport to a drilling rig and provides the drilling fluid during use in the bore hole with enhanced properties over a wide temperature and shear range.

It is a further object of the present invention to provide an additive to an invert emulsion drilling fluid, which can contain or not contain an organoclay, which will prevent settling of the other additives in the drilling fluid, during the transfer of the drilling fluid from the mud plant to the drilling site.

It is a further object of the present invention to provide a drilling fluid using a rheological thixotrope which thixotrope is either entirely free of volatile solvents, or contains a greatly reduced amount of such solvents, is easily incorporated into the fluid and is in a pourable, pumpable form fluid at ambient temperatures.

Summary of the Invention

The invention discloses new drilling fluids, particularly oil invert drilling muds, which are distinguished by improved anti-settling properties, high ecological acceptability, and at the same time exhibit good storage, transportation and application properties. Invert emulsion drilling fluids are described at length in U.S. Pat. No. 4,436,636, obtained by NL Industries, Inc., a predecessor of the assignee herein.

One important area of application for the new drilling fluid systems is in both on and off-shore wells for the development of hydrocarbon deposits, the aim of the invention being particularly to make available industrially usable drilling fluids with enhanced anti-settling properties over wide temperatures and shear ranges. The use of the new drilling fluid systems has particular significance in the marine environment, but is not limited to this field. The new mud system also can be put to use in land-based drilling operations beyond hydrocarbons, for example, in geothermal wells, bore-holes for water, deep waste injection-disposal wells, geoscientific bores, and solution-extraction mining bores such as those for common salt.

In addition to organoclays and the additives described herein, the inventive drilling fluid may contain other additives providing other properties, so as to obtain desired application properties, such as, for example, emulsifiers or emulsifier systems, weighting agents, fluid loss-prevention additives and wetting additives.

This invention is of drilling fluid system containing a liquid thixotrope, which thixotrope free of solvents or any other diluent, is in easily usable, liquid form, pourable at ambient temperatures, and provides effective and efficient rheological properties when used at low levels in such systems.

In one specific aspect, the present invention provides an oil or oil invert emulsion drilling fluid composition, which contains a rheological additive which comprises the reaction product of a) an alkoxylated nitrogen containing compound or a diamine, and b) one or more polycarboxylic acids. This additive is liquid and pourable at or at nearly 100% active material without the need of a volatile solvent, and provides acceptable rheology and viscosity to a large variety of organic and other systems at low levels of use.

Further advantages and features of the invention, as well as the scope, nature and utilization of the invention, will become apparent to those of ordinary skill in the art from the description of the preferred embodiment of the invention set forth below.

DESCRIPTION OF THE PREFERRED EMBODIMENTS

This invention in a most preferred embodiment is of drilling fluid system containing in addition to one or more organoclays a specific liquid thixotrope/anti settling additive. When such thixotrope is incorporated under low shear conditions into a drilling fluid, such as by typical mud plant mixing devices, sufficient viscosity to suspend solids such as weighting agents is developed. This increased viscosity is sustainable during drilling fluid transportation so to allow a homogeneous fluid to be transported from a mud plant to a drilling rig.

Downhole conditions of drilling, particularly high shear as when a fluid is pumped through a drilling bit and increased temperature, substantially reduce the viscosity built by the additives of the present invention. This is of surprising benefit as organophilic clays presently used in invert emulsion drilling fluids tend to build viscosity when subjected to high shear and increased temperature when circulated through a drilling bit.

The increase in viscosity for the organoclay coupled with the viscosity losses from the additives of the present invention allow the drilling fluid to maintain a constant viscosity with respect to circulating a new mud through a drilling bit. The fall of viscosity provided by the additives of this invention sustains flat rheology and prevents the mud from becoming excessively thick and difficult to pump, due to the increased viscosity provided by the organoclay at high shear especially in cold water. If the defined additives did not provide this viscosity reduction, the mud would become very thick.

One aspect of the present invention relates to drilling fluid compositions comprising:
a) an oil or invert oil drilling fluid base formulation containing one or more organoclays and;
b) one or more rheological additives which when free of diluent are pourable at room temperature comprising the reaction product of:
   i) one or more polycarboxylic acids; and
   ii) a chemical selected from the group consisting of one or more liquid alkoxylated nitrogen containing compounds and polyether diamines which contain $\geq 2$ active hydrogen groups;
   wherein the ratio of the equivalents of carboxylic acid groups to the equivalents of active hydrogen groups is between 1.05 to 2.10.

It is important to control the stoichiometry of the reactants in order to prepare ester-terminated polyamide according to the invention. In the following discussion regarding the reactant stoichiometry, the term "equivalent(s)" will be used, and is intended to have its standard meanings as employed in the art. However, for additional clarity, it is noted that equivalents refer to the number of reactive groups present in a molar quantity of a molecule, such that a mole of a dicarboxylic acid (e.g., sebacic acid) has two equivalents of carboxylic acid. Furthermore, it is emphasized that the diacid has only two reactive groups (both carboxylic acids), and that diamine has only two reactive groups (preferably both primary amines), and these are preferably, although not necessarily, the only reactive materials present in the reaction mixture.

The compositions of the present invention are drilling fluids containing organoclay additives and, in addition, the additives more clearly defined below, which effectively impart thixotropic properties to the systems in which they are utilized. These properties are equal or better than previously known and are effective over wide ranges of shear and temperature. When used, the additives contain no solvent, or may optionally contain substantially reduced solvent. Organic or other solvent can be used at less than about 25% by weight if convenient for either manufacture or use. Compared to recent solid additives disclosed in the art, the rheological additives of this invention can be incorporated in the drilling system as liquids.

Compound a), the oil or invert oil drilling fluid base formulation, is broadly defined to mean any combination of chemicals used to prepare oil and oil inert emulsion drilling fluids as well known in the industry. In the most preferred embodiment such base formulation includes one or more organoclays. Some representative chemicals often contained in such base formulation are weighting agents, barytes, emulsifiers, fluid loss additives, salts, anti-fracture additives, and so forth.

Compounds useful for element b)i), include one or more polycarboxylic acid or acids. Such acids can be selected from the dicarboxylic acid oligomers of fatty acids having carbon chain length of from 16 to 20 carbon atoms. Exemplary fatty acids are those derived from soybean oil, tall oil, corn oil, linseed oil, cottonseed oil, castor oil, kapok seed oil, rice bran oil and mixtures thereof. Even further preferred are oligomers of fatty acids, which are substantially comprised of the dimerized fatty acid. These are normally called "dimer acids." These dimerized fatty acids constitute at least 75% by weight of dibasic acid.

The oligomerized fatty acid used preferably also may have a low monomer content such as less than about 8% by weight. The dimerized fatty acids also preferably should have a low polybasic acid content, such as less than about 20% by weight. Useful dimer acids are commercially available under the trade names Empol Dimer Acids from Henkel Corporation—Emery Group and Pripol Dimer Acids from Uniqema International. Illustrative useful preferred examples of dimer acids are Pripol 1015, Pripol 1025, Empol 1008, Empol 1018, Empol 1016, and the like. The term "dicarboxylic acids" is also used to include hydroxyl substituted dicarboxylic acids.

In addition to the dicarboxylic acids, polybasic acids, which contain more than two carboxylic acid groups are also useable. Representative examples of these polybasic acids are trimellitic acid, trimesic acid, citric acid, 1,2,3,4-butane tetracarboxylic acid and the like. Polymerized polybasic acids, which contain more than two carboxylic acid groups are also included in the definition of polybasic acids. Especially preferred polymerized polybasic acids are fatty acids having carbon chains from 48 to 60. The polymeric polybasic acids with 3 carboxylic acid groups are known as "trimer acids". These trimer acids are commercially available under the trade name Empol from Henkel Corporation—Emery Group, Pripol from Uniqema International and Unidyme from Union Camp Corporation. Representative examples of these trimer acids are Pripol 1040, Empol 1043, Empol 1052, and Unidyme 60. More preferred trimer acids are Pripol 1040 and Empol 1043, and a most preferred trimer acid is Pripol 1040. Pripol 1040 is substantially comprised (by weight) of polybasic acid (67%), dibasic acid and (31 %), and monobasic acid (2%). The amount of tri- and higher polybasic acids selected for use can be important. The amount of trimers and polybasic acids should preferably not be excessive.

Compounds useful for element b)ii) include liquid alkoxylated nitrogen containing compounds containing $\geq 2$ active hydrogen groups such as alkoxylated aliphatic amine diols and alkoxylated aliphatic amide diols, which are liquids at ambient temperatures. These compounds can normally be selected from tertiary amines with one alkyl group and preferably two hydroxyalkyl or polyoxyalkylene groups attached to the nitrogen atom and have a general chemical structure represented by the following formula (I):

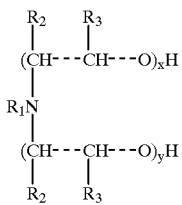

where:
(1) $R_1$, which also provides another one of the important functions of the invention, is a pendent straight or branched chain aliphatic alkyl or alkenyl or amido radical having 6 to 40 carbon atoms, preferably 8 to 20 carbon atoms, and most preferably 10 to 18 carbon atoms. Especially preferred is where $R_1$ is either $R_n$ or $R_{n-1}C=O$ where n is 12 to 18 carbon atoms such as coco, stearyl, soya, tallow, hydrogenated tallow, oleyl and mixtures thereof.
(2) $R_2$ and $R_3$ are independently selected from hydrogen or methyl.

The oxyalkylene group, which also provides one of the important functions of the invention, is represented by

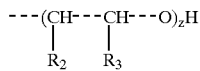

where $R_2$ and $R_3$ are independently selected from hydrogen or methyl group and z=x or y from the previous formula and the oxyalkylene group is preferably ethoxy, propoxy or a mixture thereof. At least one of x or y is at least 1, preferably both x and y are at least 1 and the sum of x+y is from 1 to 40, preferably 2 to 30, and most preferably 2 to 20. Illustrative examples of such alkoxylated aliphatic amine diols useful in this invention and represented by formula (I) are available under the trade name Varonic, from Witco Corporation, and Ethomeen from Akzo Chemie America, and include polyoxyethylene(5)cocoamine, polyoxyethylene(10)cocoamine, polyoxyethylene-(15) cocoamine, polyoxyethylene(5)octadecylamine, polyoxyethylene(10)octadecylamine, polyoxyethylene (15)octadecylamine, polyoxyethylene(5)tallowamine, polyoxyethylene-(15)tallowamine, polyoxyethylene(5) oleylamine, polyoxyethylene(15)oleylamine, polyoxyethylene(5)soyaamine, polyoxyethylene(10) soyaamine, polyoxyethylene-(15)soyaamine, wherein the number in parentheses is the sum of x+y. Useful alkoxylated aliphatic amides are also available from Akzo Chemie America under the trade name Ethomid. The use of one or more liquid alkoxylated nitrogen-containing compounds assists in making a rheological additive which is an easily pourable or pumpable liquid at ambient temperatures, but which when dispersed will provide substantial viscosity to the system to be thickened. The presence of an unsaturated moiety or moieties of the fatty chain in the liquid alkoxylated compound provides the additional benefit of lowering the melting point of the resulting rheological additive, thereby assisting in assuring a liquid rheological additive at room temperature.

Also useful for element are b)ii) polyglycol polyamines. These polyamines contain primary amino groups attached to the termini of the polyether backbone. They are also known, and referred to hereafter, as polyetherdiamines. The polyetherdiamines make up a family of products having repeating polyether backbone structures containing repeating propylene oxide, ethylene oxide, or mixed ethylene oxide/propylene oxide units such as polyoxyalkylene diamines of the formula

And

where $R_1$ is the alkylene group, $R_2$ and $R_3$ are ethylene or propylene groups, x, a, b, and c indicate number of repeating units of ethylene oxide and propylene oxide groups. These repeating units are present on average more than once.

Polyetherdiamines can also be derived from random copolymers of the formula:

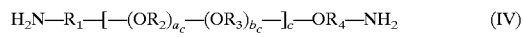

where $R_1$ and $R_4$ are the alkylene groups, $R_2$ and $R_3$ are ethylene or propylene groups, a, b and c are integers.

Polyetherdiamines known in the trade as polyglycol polyamines of various molecular weights are sold under the trade name "Jeffamines" by Huntsman Corporation, are also useful. Representative examples of such diamines are Jeffamine D-230, Jeffamine D-400, Jeffamine D-2000, Jeffamine ED-600 and Jeffamine ED-900.

Suitable polyetherdiamines also include the urea condensates of Jeffamine-D series products of the formula (V)

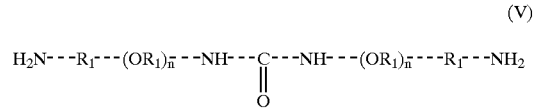

where $R_1$ is the alkylene group and n is, on the average 5.6, such as Jeffamine DU-700.

Formula II and formula III represent preferred polyetherdiamines with molecular weights ranging from 200–6000. According to the present invention a mixture of diamines is also preferred so that the average effective molecular weights range from 300–2000.

Most preferred polyetherdiamines are Jeffamine D-400 and Jeffamine ED-600. The most preferred polyetherdiamine according to this present invention is Jeffamine D-400.

The rheological compounds used in the inventive drilling fluids made according to this invention are preferably formed as the condensation reaction product of b)i) and b)ii). It is important to this invention that the reactive moieties of compound b)i) be in stoichiometric excess of the active moieties of compound b)ii) within the ratio defined above in an amount so that no substantial unreacted compound b)ii) remains after the reaction is completed. It is important to note in this regard for example that the ratio of the equivalents of carboxylic acid groups in component b)i) to the equivalents of active hydrogen groups in component b)ii) be between 1.05 and 2.1. The reaction product of b)i), and b)ii) results in a polymer with termini that contain carboxylic acid units and which functions as a rheological and anti settling additive in a similar manner to that previously described.

The product of this reaction is a liquid polymer preferably with a molecular weight of <50,000 and most preferably from 2,000–15,000. Higher molecular weight products often produce solid materials. The rheological additives of the present invention are preferably fully liquid without a diluent and of a molecular weight that permits pourability.

The useful rheological additive may be prepared according to the known polycondensation reaction. The order of the addition of the co-reactants is not generally important and these can be added either at ambient temperature or at reaction temperature. For example, the reactants may be charged in increments to a suitable reaction vessel equipped with a mechanical stirrer, a thermometer, a Dean-Stark adapter or other water collector and a nitrogen inlet. The vessel containing the reactants is heated under a blanket of nitrogen. The reaction may be carried out under atmospheric pressure or under vacuum. The reaction temperature to be used in the synthesis may be varied, but preferably ranges from ambient temperature to 300° C. under normal pressure. More preferably, the temperature ranges from ambient to 250° C., and most preferably from 120° to 220° C. Water is removed as condensate as the reaction progresses. After the completion of the reaction, the additive is cooled and discharged.

The rheological additive of the present invention may be used to thicken a variety of organic and solvent-based drilling fluid compositions. The additive is particularly useful, for example, in thickening aliphatic and aromatic solvent-based and synthetic oil-based drilling fluid compositions, and may also be used in polar (ketones, alcohols, esters) based compositions.

The liquid rheological additives are preferably used in oil-mud formulations. By the use of small amounts of these liquid additives in conjunction with organoclays improved drilling mud formulations are obtained. These additives produce higher yield points, and higher low shear rheology, while maintaining relatively constant plastic viscosities over a wide range of temperatures and shear ratios.

Since the additive is an easily pourable or a pumpable rheological liquid it can be incorporated very easily into a variety of drilling fluid compositions at various stages of their preparation. It can be added at the beginning of processing, during processing, as a post-add, or during drilling operations.

The amount of rheological additive used in a specific instance is determined by numerous factors, including the type of the drilling fluid composition to be thickened, and the level of thickening desired. However, a general range is from about 0.5 to about 30 pounds per barrel of composition. On a weight basis, the amount of the rheological additive is generally from about 0.1 to about 10% by weight, preferably from about 0.1 to about 8% by weight, more preferably from about 0.1 to about 5% by weight and most preferably from about 0.2% to about 3% by weight of the system to be thickened.

The rheological additives used in the present invention may be synthesized with or without a catalyst. The catalyst, if used, may be selected from those, which are normally used for condensation reactions. Examples of such catalysts include, but are not limited to, sulfuric acid, p-toluene sulfonic acid, dibutytin dilaurate, tetraalkyl tin or titanium compounds, metal hydrides and the like. A preferred catalyst is p-toluene sulfonic acid. The catalyst should generally be used in an amount of from about 0.001 to 2.5 percent by weight based on the total weight of the reactants.

The additive useful in the present invention may be manufactured with or without an organic solvent. Since the form of the rheological control agent is a solvent-free diluent-free pourable liquid, it is preferable to synthesize the product in a solvent-free environment. Since the solvent-free product may be a viscous liquid, it may be appropriate to use a solvent at the let down stage during the synthesis to make the product even more pourable. When a solvent is used during synthesis, the type of solvent is not critical except that it be unreactive with the reactants. If it is appropriate to use a solvent during the synthesis, the same solvent used into the drilling mud composition in which the rheological additive could be incorporated may be preferred.

Solvents, if used, for synthesizing the rheological additive useful in the drilling fluids of this invention are preferably aromatic solvents, such as toluene, xylene, aromatic petroleum distillates and mixtures thereof, aliphatic solvents such as hexane, heptane, cyclohexane and aliphatic petroleum distillates and mixtures thereof. The most preferred such solvents are aromatic petroleum distillates such as being sold under the trade name Aromatic 100 by Exxon Chemical Company. A combination of solvents could be employed as long as the solvents are compatible with the addition to the total mud formulation. The solvent should generally be used from 0 to 25 percent by weight of the reaction mixture, most preferably 0 percent.

The useful rheological additives described are preferably solvent-free (zero VOC) or contain substantially reduced solvent (low VOC) and they are thus easily incorporated with all drilling fluid including deepwater systems regardless of VOC specification. Since the rheological additives are easily pourable liquids, they are easily incorporated at low activation temperatures in almost all drilling fluid systems.

Rheological additives generally are used in drilling fluids to provide viscosity needed to suspend weighting material and cuttings in a drilling fluid. Organoclay and polymeric viscosifier, for example, are added at the mud plant and on the rig under low shear mixing conditions. In the laboratory, such organoclays and polymeric vicosifiers are incorporated into the drilling mud using a Hamilton Beach or Multimixer mixers. Typically, the materials are added at low to medium speed to simulate mud plant mixing conditions. The rheological additives described for this invention similarly can be added at any point in the mixing procedure, providing there is sufficient base fluid to insure good mixing.

The liquid additives to be used in the inventive drilling fluids of this invention may be made using a variety of materials and by a variety of methods either disclosed herein, or which will appear obvious when the disclosure of this patent occurs. Applicants do not intend to limit the materials or methods of manufacture of such additives by the description above.

The rheological additives described in this invention can be added to a base fluid consisting of brine and emulsifiers preferably prior to weighting materials being added. The additive is then mixed to uniformly distribute the material in the drilling fluid. Mixture is preferably at low speed. After or before the rheological additives are incorporated, other additives including weighting materials and fluid loss additives can be incorporated completing the drilling fluid. We define an oil or invert oil base drilling formulation to be everything in the drilling fluid composition except the rheological additive.

Description of Tests

The present invention is exemplified and compared in the following examples. However, the examples should not be construed as limiting the invention.

EXAMPLE 1

To a 250 ml resin kettle equipped with a thermometer, a Dean-Stark adapter, a mechanical stirrer and a nitrogen inlet, 33.76 grams (0.08 mole, 0.16 equivalents) Ethomeen C-15 and 70.13 grams (0.12 mole, 0.24 equivalents) Pripol 1015 were charged. The mixture is heated to 200° C. with stirring under a blanket of nitrogen. Water starts to come off at 170° C. After an hour at 200° C., aliquots are taken hourly and the acid and the amine values are determined. The reaction is completed when the acid value remains constant. At the end of the reaction, the product is cooled and discharged.

Infrared analysis of the product indicated the presence of ester band at 1739.7 $cm^{-1}$. Molecular weight analysis with GPC methods against polystyrene standard indicated an average molecular weight of 3375. The product was designated Example 1.

EXAMPLES 2-9

The general procedure outlined in Example 1 is used, except that the reactants were replaced as indicated in Table 1. All examples were liquid.

EXAMPLE 10

To a 250 ml resin kettle equipped with a thermometer, a Dean-Stark adapter, a mechanical stirrer and a nitrogen inlet, 40 grams (0.1 mole) Jeffamine D-400 and 85.05 grams (0.15 mole) Empol 1004 were charged. The mixture is heated to 200° C. with stirring under a blanket of nitrogen. Water starts to come off at 170° C. After an hour at 200° C., aliquots are taken hourly and the acid and the amine values are determined. The reaction is completed when the acid value remains constant. At the end of the reaction, the product is cooled and discharged.

EXAMPLE 11

To a 250 ml resin kettle equipped with a thermometer, a Dean-Stark adapter, a mechanical stirrer and a nitrogen inlet, 80 grams (0.04 mole) Jeffamine D-2000 and 35.06 grams (0.06 mole) Pripol 1015 were charged. The mixture is heated to 200° C. with stirring under a blanket of nitrogen. Water starts to come off at 170° C. After an hour at 200° C., aliquots are taken hourly and the acid and the amine values are determined. The reaction is completed when the acid value remains constant. At the end of the reaction, the product is cooled and discharged.

TABLE 1

| Example | Reagents | Weights, grams (mole) | Equivalents | Acid value* | Amine value* |
|---|---|---|---|---|---|
| 2 | Ethomeen C-15 | 50.64 (0.12) | 0.24 | 11.7 | 56.3 |
|   | Empol 1004 | 68.04 (0.12) | 0.24 |   |   |
| 3 | Ethomeen C-15 | 44.31 (0.105) | 0.21 | 28.80 | 43.50 |
|   | Empol 1004 | 79.38 (0.14) | 0.28 |   |   |
| 4 | Ethomeen C-15 | 42.20 (0.10) | 0.20 | 25.61 | 48.40 |
|   | Empol 1004 | 70.88 (0.125) | 0.25 |   |   |
| 5 | Ethomeen C-15 | 42.20 (0.10) | 0.20 | 21.0 | 43.60 |
|   | Empol 1004 | 68.04 (0.12) | 0.24 |   |   |
| 6 | Ethomeen C-15 | 33.76 (0.08) | 0.16 | 46.4 | 47.50 |
|   | Empol 1018 | 69.23 (0.12) | 0.24 |   |   |
| 7 | Ethomeen C-15 | 33.76 (0.08) | 0.16 | 52.7 | 41.2 |
|   | Empol 1004 | 45.36 (0.08) | 0.16 |   |   |
|   | Empol 1040 | 34.72 (0.04) | 0.12 |   |   |
| 8 | Ethomeen C-15 | 50.64 (0.12) | 0.24 | 21.0 | 50.4 |
|   | Empol 1004 | 68.04 (0.12) | 0.24 |   |   |
|   | Empol 1040 | 17.36 (0.02) | 0.06 |   |   |
| 9 | Ethomeen C-15 | 33.76 (0.08) | 0.16 | 65.1 | 34.0 |
|   | Empol 1004 | 90.72 (0.16) | 0.32 |   |   |
| 10 | Jeffamine D-400 | 40.00 (0.10) | 0.20 | 52.02 | 1.0 |
|   | Empol 1004 | 85.05 (0.15) | 0.30 |   |   |
| 11 | Jeffamine D-2000 | 80.00 (0.04) | 0.08 | 24.17 | 1.0 |
|   | Pripol 1015 | 35.06 (0.06) | 0.12 |   |   |

*The acid and the amine values (mg KOH/g of sample) indicated are for the final product.

Evaluations of Drilling Fluids

I. Deepwater Drilling Mud Systems

All the materials prepared according to Examples 1–11 were incorporated into standard deepwater screening formula and a number of tests were conducted to demonstrate the effectiveness of the respective rheological additive.

The preparation and components of a standard deepwater screening formula is described in Formulation A. Drilling fluid properties were measured on the initial muds (before hot roll) and after hot rolling at 150° F. (66° C.) and 300° F. (149° C.). All drilling fluid properties, viscosity, electrical stability were measured at 120° F. (49° C.). Viscosity was tested on a Fann 35 and a Brookfield LVT viscometers and electrical stability was tested with a Fann Model 23D Electrical Stability Tester. After the initial measurements were taken the muds were hot rolled at 150° F. (66° C.) for 16 hours and hot rolled properties were measured. The muds were hot rolled again at 300° F. (149° C.) for another 16 hours and hot rolled properties were measured.

Results were reviewed for the degree on viscosity reduction after each hot roll cycle. The rheological additives of the present invention provide high initial (before hot rolling) viscosity build with a drop in viscosity after each successive hot roll cycles.

A mud plant formulation was prepared according to the procedure described in Formulation A immediately below without the addition of a rheological additive (See comparative Example 1). The drilling fluid properties were evaluated and are set forth in Table 1 using each specific example product.

FORMULATION A

| Material | Generic | Weight in grams |
|---|---|---|
| Step 1: Weigh the following items into a Hamilton Beach/Multi Mixer cup ||| 
| Base Fluid | $C_{16}/C_{18}$ isomerized alpha olefins | 185.8 (0.62 bbl) |
| Primary Emulsifier | Polyamide/amide amine | 8.0 |
| Secondary Emulsifier | Tall Oil Fatty Acid | 4.0 |
| 30% Calcium chloride Brine | 94–97% Calcium chloride | 75.0 |
| Lime |  | 4.0 |
| Mix for 5 minutes on low or medium speed then add ||| 
| Step 2: Primary viscosifier addition ||| 
| BENTONE 155* | Organoclay | 3.0 |
| Mix for 2 minutes on low or medium speed, then add ||| 
| Step 3: Low shear rheological additive addition ||| 
| Rheological Additive |  | 1.6 |
| Mix for 15 minutes on low speed then add ||| 
| Step 4: Weighting agent and Fluid Loss Additive ||| 
| Amine Treated Lignite | Fluid Loss Additive | 8.0 |
| Barite | Weighting Material | 212.0 |
| Mix for 10 minutes on low or medium speed |||

*Organoclay from Elementis Specialties.

TABLE 1

Deepwater Additive Evaluation in IAO, 85/15 OWR, 12-ppg invert Mud
Rheological Additive Level: 1.6 pounds per barrel

| Rheological Additive | COMPARATIVE EXAMPLE 1 | | | Example 1 | | | Example 2 | | | Example 3 | | |
|---|---|---|---|---|---|---|---|---|---|---|---|---|
| Hot Roll Conditions, 16 Hrs. @ ° F. | Initial | 150 | 300 | Initial | 150 | 300 | Initial | 150 | 300 | Initial | 150 | 300 |
| Plastic Viscosity, cP | 20 | 22 | 21 | 20 | 23 | 23 | 20 | 28 | 27 | 23 | 28 | 24 |
| Yield Point, lbs/100 sq. ft | 9 | 12 | 4 | 22 | 11 | 3 | 20 | 10 | 1 | 16 | 12 | 2 |
| Apparent Viscosity | 24.5 | 28 | 23 | 31 | 28.5 | 24.5 | | | | 31 | 34 | 25 |
| Gels, 10 sec, plbs. 100 sq. ft | 4 | 7 | 5 | 9 | 10 | 8 | 7 | 11 | 9 | 7 | 9 | 7 |
| Brookfield LVT #3 Viscosity, cP | | | | | | | | | | | | |
| 30 RPM | 448 | 596 | 280 | 964 | 660 | 360 | 832 | 740 | 400 | 744 | 684 | 360 |
| 3 RPM | 2800 | 3920 | 1600 | 4680 | 4960 | 2800 | 4000 | 5640 | 2800 | 3280 | 5120 | 2800 |
| 0.3 RPM | 16800 | 19200 | 10000 | 15200 | 17200 | 14000 | 12000 | 17600 | 14000 | 11200 | 16800 | 12000 |
| Emulsion Stability, Volts | 740 | 750 | 497 | 500 | 770 | 670 | 400 | 650 | 610 | 310 | 680 | 620 |
| Fann Viscosity (Model 35A) | | | | | | | | | | | | |
| 600 RPM | 49 | 56 | 46 | 62 | 57 | 50 | 60 | 66 | 55 | 62 | 68 | 50 |
| 300 RPM | 29 | 34 | 25 | 42 | 34 | 26 | 40 | 38 | 28 | 39 | 40 | 26 |
| 200 RPM | 22 | 25 | 18 | 34 | 26 | 18 | 31 | 30 | 20 | 34 | 30 | 19 |
| 100 RPM | 14 | 18 | 12 | 26 | 18 | 12 | 23 | 20 | 13 | 25 | 20 | 12 |
| 6 RPM | 5 | 7 | 4 | 11 | 8 | 5 | 9 | 9 | 6 | 9 | 9 | 5 |
| 3 RPM | 4 | 6 | 3 | 9 | 7 | 4 | 7 | 8 | 5 | 7 | 8 | 5 |

| Rheological Additive | Example 4 | | | Example 5 | | | Example 6 | | | Example 7 | | |
|---|---|---|---|---|---|---|---|---|---|---|---|---|
| Hot Roll Conditions, 16 Hrs. @ ° F. | Initial | 150 | 300 | Initial | 150 | 300 | Initial | 150 | 300 | Initial | 150 | 300 |
| Plastic Viscosity, cP | 22 | 26 | 25 | 22 | 25 | 25 | 26 | 25 | 26 | 23 | 27 | 25 |
| Yield Point, lbs/100 sq. ft | 19 | 14 | 1 | 19 | 13 | 2 | 14 | 14 | 0 | 18 | 14 | 5 |
| Apparent Viscosity | | | | | | | | | | | | |
| Gels, 10 sec, plbs. 100 sq. ft | 8 | 10 | 8 | 8 | 12 | 6 | 7 | 9 | 8 | 10 | 10 | 11 |
| Brookfield LVT #3 Viscosity, cP | | | | | | | | | | | | |
| 30 RPM | 848 | 704 | 320 | 812 | 724 | 320 | 700 | 704 | 280 | 884 | 720 | 440 |
| 3 RPM | 3600 | 5120 | 2400 | 3480 | 5400 | 2400 | 3440 | 5120 | 2200 | 4880 | 4920 | 3400 |
| 0.3 RPM | 11600 | 18800 | 12000 | 10000 | 18400 | 12000 | 11600 | 18400 | 12000 | 15600 | 15200 | 16800 |
| Emulsion Stability, Volts | 400 | 650 | 600 | 320 | 670 | 618 | 350 | 725 | 590 | 425 | 535 | 660 |
| Fann Viscosity (Model 35A) | | | | | | | | | | | | |
| 600 RPM | 63 | 66 | 52 | 63 | 63 | 54 | 66 | 64 | 52 | 64 | 68 | 55 |
| 300 RPM | 41 | 40 | 26 | 41 | 38 | 27 | 40 | 39 | 26 | 41 | 41 | 30 |
| 200 RPM | 33 | 30 | 19 | 33 | 28 | 27 | 39 | 29 | 18 | 32 | 32 | 22 |
| 100 RPM | 25 | 20 | 12 | 24 | 19 | 12 | 24 | 20 | 11 | 23 | 21 | 15 |
| 6 RPM | 9 | 9 | 5 | 10 | 9 | 4 | 8 | 9 | 4 | 9 | 9 | 7 |
| 3 RPM | 7 | 8 | 4 | 7 | 8 | 4 | 6 | 8 | 4 | 8 | 8 | 6 |

| Rheological Additive | Example 8 | | | Example 9 | | | Example 10 | | | Example 11 | | |
|---|---|---|---|---|---|---|---|---|---|---|---|---|
| Hot Roll Conditions, 16 Hrs. @ ° F. | Initial | 150 | 300 | Initial | 150 | 300 | Initial | 150 | 300 | Initial | 150 | 300 |
| Plastic Viscosity, cP | 23 | 26 | 22 | 23 | 24 | 25 | 21 | 23 | 24 | 24 | 24 | 22 |
| Yield Point, lbs/100 sq. ft | 20 | 11 | 3 | 18 | 11 | 4 | 11 | 9 | 1 | 5 | 7 | 6 |
| Apparent Viscosity | | | | | | | 26.5 | 27.5 | 24.5 | 26.5 | 27.5 | 25 |
| Gels, 10 sec, plbs. 100 sq. ft | 9 | 10 | 5 | 8 | 10 | 7 | 9 | 9 | 7 | 8 | 7 | 8 |
| Brookfield LVT #3 Viscosity, cP | | | | | | | | | | | | |
| 30 RPM | 900 | 760 | 280 | 712 | 632 | 360 | 640 | 675 | 444 | 572 | 660 | 524 |
| 3 RPM | 4360 | 7920 | 2000 | 4640 | 4360 | 2400 | 4480 | 4640 | 3000 | 4120 | 4520 | 3480 |
| 0.3 RPM | 12000 | 17200 | 14000 | 19200 | 12400 | 14000 | 9600 | 12400 | 10400 | 13600 | 13200 | 9200 |
| Emulsion Stability, Volts | 375 | 725 | 410 | 375 | 685 | 370 | 924 | 905 | 483 | 927 | 866 | 409 |
| Fann Viscosity (Model 35A) | | | | | | | | | | | | |
| 600 RPM | 66 | 63 | 47 | 64 | 59 | 54 | 53 | 55 | 49 | 53 | 55 | 50 |
| 300 RPM | 43 | 37 | 25 | 41 | 35 | 28 | 32 | 32 | 25 | 29 | 31 | 28 |
| 200 RPM | 32 | 28 | 17 | 32 | 27 | 20 | 24 | 25 | 19 | 22 | 24 | 21 |
| 100 RPM | 24 | 20 | 11 | 23 | 18 | 23 | 17 | 18 | 10 | 15 | 17 | 15 |
| 6 RPM | 10 | 10 | 4 | 8 | 7 | 5 | 8 | 8 | 5 | 7 | 9 | 7 |
| 3 RPM | 9 | 9 | 3 | 7 | 7 | 4 | 8 | 8 | 5 | 7 | 8 | 7 |

Discussion of Results

The rheological additives useful in the present invention when used in conjunction with organoclays produce significant and rapid increase in the Fann 6 and 3 rpm viscosity, thus reducing/eliminating barite sag/settling when incorporated under ultra low shear mixing conditions encountered in a mud plant.

In addition, the viscosity developed by the rheological additives decrease with increasing temperature and circulation in the well. Without being bound by theory, it is believed this decreases the additives' rheological contribution to the drilling fluid while the rheological contribution of the organoclay is increased (the organoclay begins to yield as the mud is sheared while circulating through the drill bit) providing stable and flat viscosity. This fall-off in viscosity of the additive maintains flat rheology and prevents the mud from becoming excessively thick and difficult to pump, especially in cold water. If the rheological additives do not exhibit this reduction in viscosity the mud would become very thick because of the known increase in viscosity caused by organoclays under high shear conditions.

The organoclay and the described additives surprisingly work with each other to provide a relatively flat viscosity profile over a wide shear range.

What we claim:

1. An oil or invert oil based drilling fluid composition comprising:
   a) an oil or invert oil drilling fluid base formulation containing one or more organoclays and;
   b) one or more rheological additives which when free of diluent are pourable at ambient temperature comprising the condensation reaction product of:
      i) one or more polycarboxylic acids; and
      ii) a chemical selected from the group consisting of one or more liquid alkoxylated nitrogen containing compounds and polyetherdiamines which contain $\geq 2$ active hydrogen groups;
      wherein the ratio of equivalents of carboxyl acids groups to the equivalents of active hydrogen groups is between 1.05 to 2.10.

2. The drilling fluid composition of claim 1, wherein the chemical of subparagraph b) was made without use of a solvent.

3. The drilling fluid composition of claim 1, wherein the chemical of subparagraph b)ii) is selected from the group consisting of alkoxylated aliphatic amine diols and alkoxylated aliphatic amide diols.

4. The drilling fluid composition of claim 1, wherein the chemical of subparagraph b)ii) is a tertiary amine with one alkyl group.

5. The drilling fluid composition of claim 4, wherein the tertiary amine has two hydroxyalkyl groups.

6. The drilling fluid composition of claim 1, wherein the chemical of subparagraph b)ii) is a polyetherdiamine.

7. The drilling fluid composition of claim 1, wherein the polycarboxylic acid is selected from the group consisting of dicarboxylic acid oligomers of fatty acids having carbon chain lengths of between 16 and 20 carbon atoms and polybasic acids which contain more than two carboxylic acid groups.

8. The drilling fluid composition of claim 1, wherein the ratio of the number of equivalents of polycarboxylic acid of paragraph b)i) to the active hydrogen groups of paragraph b)ii) is between 1.5 and 2.0.

9. The drilling fluid composition of claim 1, wherein the base drilling fluid formulation contains more than one organoclay.

10. An oil or invert oil based drilling fluid composition comprising:
    a) an oil or invert oil drilling fluid base formulation containing one or more organoclays and
    b) one or more additives comprising the reaction product of
       i) one or more polymerized polybasic acids having a carbon chain of from 48 to 60 carbon atoms; and
       ii) one or more alkoxylated aliphatic amine diols;
       wherein the ratio of the number of equivalents of b)i to the equivalents b)ii is between 1.05 to 2.10.

11. The drilling fluid composition of claim 10, wherein the ratio of the number of equivalents of the polycarboxylic acid of paragraph b)i) to the active hydrogen groups of paragraph b)ii) is between 1.5 and 2.

12. The drilling fluid composition of claim 10, wherein the polybasic acid is one or more trimer acids.

13. The drilling fluid composition of claim 10, wherein the base drilling fluid formulation contains two or more organoclays.

14. An oil or invert oil based drilling fluid composition comprising
    a) an oil or invert oil drilling fluid base formulation and
    b) one or more rheological additives which when free of diluent are pourable at ambient temperature comprising the condensation reaction product of:
       i) one or more polycarboxylic acids; and
       ii) a chemical selected from the group consisting of one or more liquid alkoxylated nitrogen containing compounds, diamines and polyether diamines which contain $\geq 2$ active hydrogen groups;
       wherein the ratio of the equivalents of carboxyl acids groups to the equivalents of active hydrogen groups is between 1.05 to 2.10.

15. The drilling fluid composition of claim 14 wherein the base formulation contains an organoclay.

* * * * *